(12) United States Patent
Zabel

(10) Patent No.: US 10,429,100 B2
(45) Date of Patent: Oct. 1, 2019

(54) CLAMPING DEVICE AND METHOD FOR MOUNTING A SOLAR MODULE

(71) Applicant: SOLIBRO HI-TECH GMBH, Bitterfeld-Wolfen, OT Thalheim (DE)

(72) Inventor: Christian Zabel, Nienburg (DE)

(73) Assignee: Solibro Hi-Tech GmbH, Bitterfeld-Wolfen, OT Thalheim (DE)

( * ) Notice: Subject to any disclaimer, the term of this patent is extended or adjusted under 35 U.S.C. 154(b) by 0 days.

(21) Appl. No.: 15/550,826

(22) PCT Filed: Feb. 10, 2016

(86) PCT No.: PCT/EP2016/052771
§ 371 (c)(1),
(2) Date: Aug. 14, 2017

(87) PCT Pub. No.: WO2016/128429
PCT Pub. Date: Aug. 18, 2016

(65) Prior Publication Data
US 2018/0031278 A1    Feb. 1, 2018

(30) Foreign Application Priority Data

Feb. 12, 2015  (DE) .......... 10 2015 202 596

(51) Int. Cl.
*H02S 20/23*   (2014.01)
*F24S 25/636*  (2018.01)
(Continued)

(52) U.S. Cl.
CPC ............ *F24S 25/636* (2018.05); *B23P 19/04* (2013.01); *F16B 2/005* (2013.01); *F16B 2/14* (2013.01); *F16B 5/0635* (2013.01); *F24S 25/67* (2018.05); *H02S 20/23* (2014.12); *F24S 2025/016* (2018.05); *Y02E 10/47* (2013.01)

(58) Field of Classification Search
CPC ........................................................ H02S 20/23
USPC ....... 52/173.3, 656.1, 464; 248/316.1, 316.2, 248/316.3, 634, 229.11, 229.2, 229.21, 248/231.31; 136/244, 251
See application file for complete search history.

(56) References Cited

U.S. PATENT DOCUMENTS

| | | | | |
|---|---|---|---|---|
| 4,455,803 A | * | 6/1984 | Kornberger | ............. E04D 3/366 52/395 |
| 5,076,035 A | | 12/1991 | Wright | |

(Continued)

FOREIGN PATENT DOCUMENTS

| CN | 201804876 U | 4/2011 |
|---|---|---|
| DE | 20110459 U1 | 10/2001 |

(Continued)

*Primary Examiner* — Terrell L McKinnon
*Assistant Examiner* — Michael McDuffie
(74) *Attorney, Agent, or Firm* — Laurence A. Greenberg; Werner H. Stemer; Ralph E. Locher

(57) ABSTRACT

A clamping device for a solar module has or forms at least a first receiving portion for receiving an edge portion of the solar module. The first receiving portion has at least a first side wall portion and an additional side wall portion for constructing a receiving region. The first receiving portion is constructed in an integral manner. The elasticity modulus of the first receiving portion is greater than the elasticity modulus of rubber. There is also disclosed a method for assembling a solar module.

17 Claims, 5 Drawing Sheets

(51) Int. Cl.
*F24S 25/67* (2018.01)
*B23P 19/04* (2006.01)
*F16B 2/00* (2006.01)
*F16B 2/14* (2006.01)
*F16B 5/06* (2006.01)
*F24S 25/00* (2018.01)

(56) References Cited

U.S. PATENT DOCUMENTS

| | | | | |
|---|---|---|---|---|
| 5,806,256 | A * | 9/1998 | Byrne | E06B 3/08 |
| | | | | 52/204.5 |
| 8,181,402 | B2 * | 5/2012 | Tsuzuki | F24S 20/67 |
| | | | | 52/173.3 |
| 8,261,496 | B2 * | 9/2012 | Sahlin | H01L 31/0481 |
| | | | | 126/704 |
| 8,272,189 | B2 * | 9/2012 | Chan | F24S 25/67 |
| | | | | 52/792.11 |
| 8,505,224 | B2 * | 8/2013 | Huang | H02S 30/10 |
| | | | | 126/704 |
| 8,935,893 | B2 * | 1/2015 | Liu | F16L 3/06 |
| | | | | 52/173.3 |
| 9,531,319 | B2 | 12/2016 | Braunstein et al. | |
| 2003/0070368 | A1 * | 4/2003 | Shingleton | F24J 2/5205 |
| | | | | 52/173.3 |
| 2003/0201009 | A1 * | 10/2003 | Nakajima | H02S 20/23 |
| | | | | 136/251 |
| 2005/0115176 | A1 * | 6/2005 | Russell | E04D 3/3608 |
| | | | | 52/220.1 |
| 2009/0200443 | A1 * | 8/2009 | Burtscher | F24S 25/636 |
| | | | | 248/316.1 |
| 2010/0219304 | A1 * | 9/2010 | Miros | F24S 25/61 |
| | | | | 248/125.8 |
| 2010/0236183 | A1 * | 9/2010 | Cusson | F24J 2/5207 |
| | | | | 52/645 |
| 2011/0272368 | A1 | 11/2011 | Kufner | |
| 2012/0097207 | A1 * | 4/2012 | Shufflebotham | B32B 38/1841 |
| | | | | 136/244 |
| 2012/0138764 | A1 | 6/2012 | Kemple | |
| 2013/0220395 | A1 | 8/2013 | Babineau, Jr. et al. | |
| 2014/0318604 | A1 | 10/2014 | Schrock | |
| 2015/0040967 | A1 * | 2/2015 | West | H02S 20/23 |
| | | | | 136/251 |
| 2015/0280638 | A1 * | 10/2015 | Stephan | H02S 20/23 |
| | | | | 52/173.3 |
| 2016/0173024 | A1 * | 6/2016 | Itou | H02S 30/10 |
| | | | | 136/251 |
| 2016/0197218 | A1 * | 7/2016 | Itami | H01L 31/048 |
| | | | | 136/251 |

FOREIGN PATENT DOCUMENTS

| | | |
|---|---|---|
| DE | 202009014048 U1 | 3/2010 |
| DE | 202009015056 U1 | 4/2010 |
| DE | 202010006442 U1 | 9/2010 |
| DE | 102010062384 A1 | 6/2012 |
| EP | 2592197 A1 | 5/2013 |
| WO | 2012012998 A1 | 2/2012 |
| WO | 2015100048 A1 | 7/2015 |

* cited by examiner

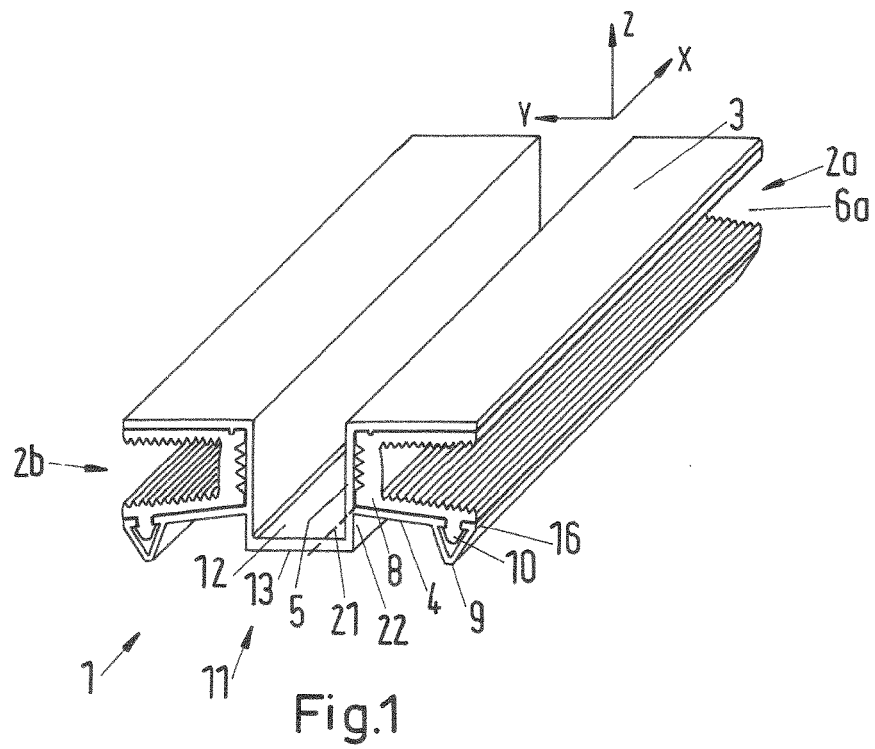

CLAMPING DEVICE AND METHOD FOR MOUNTING A SOLAR MODULE

BACKGROUND OF THE INVENTION

Field of the Invention

The invention relates to a clamping device for a solar module and a method for assembling a solar module.

In particular with frameless glass/glass solar modules, a redirection of tensile and pressure forces which act on the solar module into a carrier structure is preferably intended to be ensured only in specific portions of an edge region of the solar module in order to prevent a breakage of the solar module.

DE 20 2009 015 056 U1 discloses a clamping device for securing plate-like elements to a carrier, wherein the clamping device has a substantially rigid base member with clamping wings at one or both sides and a resilient member which provides at one or both sides receiving regions having an upper flank, a lower flank and a rear side for the plate-like elements. In this instance, the resilient member forms a base which receives the substantially rigid base member.

DE 20 2009 014 048 U1 also discloses a clamping device for plate-like elements having a base member having clamping wings at one or both sides and central support elements and having one or two substantially U-shaped, outwardly open resilient profiles. The resilient profile is in abutment with a lateral flank below the clamping wing and with the rear side partially against the central support elements. Furthermore, at least one, preferably two, substantially U-shaped rigid profiles is/are arranged on the base member and provided in order to form an abutment for the rear side of the resilient profile.

Neither DE 20 2009 014 048 U1 nor DE 20 2009 015 056 U1 disclose a clamping device which is constructed as one component and whose receiving region is formed by means of a profile which is constructed in a bending-resistant manner.

SUMMARY OF THE INVENTION

The technical problem is aimed at providing a clamping device for a solar module and a method for assembling a solar module which enable reliable securing of the solar module to differently constructed carrier structures, ensure a desired force redirection in each of the differently constructed carrier structures, reduce production costs for the clamping device and simplify the assembly of a solar module on a carrier structure. The force redirection may in particular be carried out in a uniform manner over an entire securing face of the carrier structure if the clamping device is in abutment with the securing face in the secured state. Another partial problem may be provision of a clamping device for a solar module and a method for assembling a solar module which enable the adjustment of different levels of or a predetermined minimum spacing between a lower side of the solar module and the carrier structure.

A basic notion of the invention is to provide and use in a method for assembling a solar module a clamping device which is constructed in one piece and whose receiving region is enclosed by bending-resistant or non-resilient side wall portions and which in different support states on a carrier structure ensures a uniform and extensive redirection of forces from the solar module via the clamping device into the carrier structure. Furthermore, a defined spacing with respect to the carrier structure or substructure can be ensured.

A clamping device for a solar module is proposed. The solar module may in particular be a so-called glass/glass solar module, wherein both an upper side of the solar module and a lower side of the solar module are formed by a glass member. However, the clamping device is of course also suitable for clamping other members, in particular plate-like members.

Reference is made below to a reference coordinate system of the clamping device which has a longitudinal axis, a transverse axis and a vertical axis. The vertical axis is orientated parallel with a surface normal of an upper or lower side of a solar module which is received in a receiving portion of the clamping device. The longitudinal axis of the clamping device may be parallel with the extension direction of the edge of the solar module whose portion is arranged in the receiving portion. The transverse axis may be orientated orthogonally relative to the longitudinal axis and the vertical axis. In particular the transverse axis may also be orientated orthogonally relative to a side edge face of the edge portion.

Direction-related terms, such as "top", "bottom", "above", "below" may relate to the reference coordinate system, for example, the vertical axis.

The proposed clamping device serves in particular to receive, clamp and secure an edge portion of a longitudinal or end side of the solar module to a carrier structure. The length of the received edge portion is preferably smaller than the entire length of the longitudinal or transverse side.

The clamping device has at least a first receiving portion for receiving the edge portion of the solar module or forms it. It is possible for the clamping device to have or form precisely one receiving portion. However, it is also possible for the clamping device to have or form precisely two receiving portions, wherein the first receiving portion is provided for receiving an edge portion of a first solar module and the additional receiving portion for receiving an edge portion of an additional solar module.

The first receiving portion has at least a first side wall portion and an additional side wall portion for forming a receiving region. Furthermore, the first receiving portion may also have a base wall portion. The first and the additional receiving portions and where applicable the base wall portion may surround or enclose a receiving region or a receiving space. If a solar module is arranged in this receiving region, the first receiving portion may be arranged at an upper side of the solar module and the additional side wall portion at a lower side of the solar module. The base wall portion may be arranged at an edge side of the solar module.

The first side wall portion may also be referred to as an upper side wall portion. Accordingly, the additional side wall portion may also be referred to as a lower side wall portion. The vertical direction is orientated from bottom to top if it is orientated from the lower side of the solar module toward the upper side.

The receiving region may be open at least at one side in order to introduce the solar module. Preferably, the receiving region is open at least at three sides.

The side wall portions may in particular be constructed in a bar-like or plate-like manner. In a cross sectional plane which is orientated perpendicularly to the longitudinal axis of the clamping device, the side wall portions may have a rectangular cross section. The side wall portions may have a height or a thickness of from 1 mm to 12 mm. The height may, for example, be measured along the vertical axis.

Furthermore, the side wall portions may have a width of from 5 mm to 20 mm. The width may, for example, be measured along the transverse axis. Furthermore, the side wall portions may have a length of from 50 mm to 200 mm. The length may, for example, be measured along the longitudinal axis. The side wall portions may each have a free end and a clamped, that is to say, securely supported, end. The securely clamped end may in each case be securely connected to the base wall portion.

The clamping device or the receiving region may also have a predetermined length along the longitudinal axis, wherein this length may correspond to the length of the side wall portions. The length may, for example, be 120 mm. The length may in this instance preferably be selected in such a manner that a predetermined bending resistance about a bending axis which is orientated parallel with the transverse axis is ensured.

The first receiving portion is constructed in one piece. This may mean that the first receiving portion is constructed in an integral manner. The term "in one piece" may also mean that the components of the first receiving portion, in particular the first and the additional side wall portion, cannot be separated from each other without being destroyed. Preferably, the components of the receiving portion, in particular the first side wall portion and the additional side wall portion and where applicable the base wall portion, are constructed from a profile element, in particular an extruded profile element.

According to the invention, the elasticity modulus of the first receiving portion, in particular the additional side wall portion, is greater than the elasticity modulus of rubber. The elasticity modulus of rubber may be in a range from $0.01 \times 10^9$ N/m$^2$ to $0.1 \times 10^9$ N/m$^2$, wherein the elasticity modulus of the first receiving portion is greater than $0.1 \times 10^9$ N/m$^2$. Preferably, the elasticity modulus of the first receiving portion may be greater than or equal to the elasticity modulus of polyamide, in particular polyamide 66. In a further preferred manner, the elasticity modulus of the first receiving portion may be greater than or equal to $1 \times 10^9$ N/m$^2$, in a particularly preferred manner greater than or equal to $10 \times 10^9$ N/m$^2$ or $50 \times 10^9$ N/m$^2$.

This means that the first receiving portion and consequently in particular the first and the additional side wall portion are constructed from a material which has the elasticity modulus mentioned. Furthermore, the entire clamping device may have the elasticity modulus of the first receiving portion.

That is to say, the first side wall portion and the additional side wall portion are constructed in a more non-resilient manner than rubber or a comparably resilient material. This further means that a bending resistance of the side wall portion according to the invention is greater than a bending resistance of a corresponding side wall portion of rubber or a comparably resilient material. In this instance, the corresponding side wall portion may have the same geometric dimensions as the additional side wall portion according to the invention. The bending resistance may in particular be provided around a bending axis which is orientated parallel with the longitudinal axis. The bending axis may in this instance in particular extend along an interface between the corresponding side wall portion and the base wall portion.

Consequently, a non-resilient and bending-resistant receiving portion is produced.

In the cross sectional plane perpendicular to the longitudinal axis, the first receiving portion may have a substantially U-shaped cross section. The term U-shaped includes in this instance the fact that the side wall portions are arranged parallel or, as will be explained in greater detail below, in an inclined manner relative to each other.

If the clamping device comprises an additional receiving portion, this additional receiving portion may be constructed in accordance with the first receiving portion. In particular the additional receiving portion may also have a first (upper) side wall portion and an additional (lower) side wall portion in order to form a receiving region, wherein the additional receiving portion may also be constructed in an integral manner and wherein the elasticity modulus of the additional receiving portion is greater than the elasticity modulus of rubber. The additional receiving portion may consequently also be developed with the features or according to the aspects which are described with reference to the first receiving portion in this invention.

Preferably, in this instance, the first and the additional receiving portions are constructed in an integral manner. This may mean that all the side wall portions and where applicable base wall portions of the receiving portions are constructed by a profile element. Preferably, the clamping device is constructed as an integral clamping profile element, in particular an extruded profile element.

The integral construction advantageously enables a simplified and cost-effective production of the clamping device. Since in order to receive and clamp the solar module, two separate components do not have to be connected to each other, the assembly of solar modules is consequently also simplified. Furthermore, the proposed device enables a desired force redirection of tensile and pressure forces which act on the solar module into a corresponding carrier structure to be ensured.

In another embodiment, at least the additional side wall portion can be bent about a bending axis, wherein the bending axis is orientated parallel with the longitudinal axis of the clamping device. Preferably, the bending axis extends along the contact portion between the base wall portion and the additional side wall portion. Of course, the first side wall portion may also be able to be bent around a bending axis, wherein the bending axis is orientated parallel with the longitudinal axis and preferably extends along the contact portion between the first side wall portion and the base wall portion.

As a result of the bendability, the clamping and consequently reliable mechanical securing of a solar module in the receiving portion is advantageously enabled. In particular, an edge portion of the solar module may be arranged in a non-bent state of the first and/or additional side wall portion in the receiving region, wherein, in order to clamp the solar module, the first and/or the additional side wall portion is/are then bent.

In another embodiment, in a non-deformed, in particular non-bent, state of the additional side wall portion, the additional side wall portion is inclined at an angle greater than 0° and less than 90° with respect to the first side wall portion. The angle may in particular be in a range from 3° to 12°. For example, the angle may be 7.5°.

The angle may in this instance be an angle between planar surfaces of the side wall portions. The angle may also designate an angle between central axes of the side wall portions. Consequently, the side wall portions of the first receiving portion in the non-deformed state are not arranged parallel with each other. In the cross sectional plane perpendicular relative to the longitudinal axis, the first receiving portion may consequently have a U-shaped cross section in which a side member of the U-shaped cross section is arranged in a buckled manner or in an oblique manner. It is in particular possible for an angle between the first side wall portion and the base wall portion to be a right angle, whilst an angle between the base wall portion and the additional side wall portion is an obtuse angle.

This advantageously enables simple receiving of a solar module which is intended to be clamped in the receiving region. For securing, in particular clamping, of the solar module, the additional side wall portion may then be bent in such a manner that the solar module is clamped between the first and the additional side wall portion. Consequently, a method for assembling the solar module is advantageously simplified.

In another embodiment, in a non-deformed state of the additional side wall portion, a maximum spacing between the first and the additional side wall portion is greater than a thickness of a solar module which is intended to be clamped. A thickness of a solar module which is intended to be clamped may, for example, be 6.3 mm or 7.3 mm. Of course, other values of the thickness are also conceivable. The spacing may in this instance be measured along the vertical axis. A minimum spacing between the additional side wall portion and the first side wall portion may be greater than the thickness of the solar module which is intended to be clamped.

It is also possible for the spacing between the first and the additional side wall portion to increase in the non-deformed state along the above-explained transverse axis, in particular from an inner clamped end toward a free end of the additional side wall portion. A particularly simple assembly of the solar module on a carrier structure is thereby advantageously enabled since the solar module can be readily arranged in the receiving region before it is clamped, for example, by means of bending the additional side wall portion.

In a preferred embodiment, at least the receiving portion, in particular the first receiving portion, of the clamping device is constructed from metal. Preferably, the receiving portion is constructed from aluminum. However, it is also conceivable for the receiving portion to be constructed from plastics material, composite material or a metal alloy. The construction from metal advantageously enables simplified production of the clamping device, for example, by means of an extrusion method. Consequently, the production costs of the clamping device can also be reduced.

In another embodiment, the clamping device has a securing portion for securing to a carrier structure or forms it. The carrier structure may in this instance in particular have a planar securing face. Furthermore, the securing portion has a contact portion for support on the carrier structure, in particular the securing face of the carrier structure. The contact portion may be constructed as a contact face, preferably as a planar contact face, or have one.

The securing portion and the first receiving portion and where applicable additional receiving portions may be constructed in an integral manner. In particular, they may be formed by a profile element.

The securing portion may have or form at least one securing element. For example, the securing portion may have a through-opening for receiving a screw. The screw may, for example, be a self-cutting screw, a hammer head screw, a self-tapping screw or a displacement screw. Of course, the securing portion may also have or form alternative or additional securing means or elements, for example, clamping elements, catch elements. The securing portion may, for example, have a plate-like element, wherein the plate-like element may have the above-explained through-opening.

It is possible for the contact portion of the securing portion to be arranged along the vertical axis with a predetermined spacing from an inner end portion of the additional side wall portion. In this instance, a connection portion may be arranged between the inner end portion and the contact portion of the securing portion. The inner end portion may in this instance designate an end portion opposite the free end portion of the additional side wall portion. The inner end portion may in particular be clamped, that is to say, securely supported. This predetermined spacing may determine a minimum spacing of the lower side of a clamped solar module from the carrier structure, in particular the securing face thereof. In a non-deformed state of the first receiving portion, the plate-like portion of the securing portion may also be arranged parallel with the first side wall portion. In the non-deformed state, in particular no portion of the clamping device may be bent, in particular not the additional side wall portion. Consequently, the non-deformed state may also be referred to as the non-deformed state or non-bent state.

The securing portion advantageously enables the clamping device to be secured to a carrier structure or a substructure. In particular, the securing may be carried out independently of a dimension of the securing face of the carrier structure. Consequently, it is possible for the clamping device to be longer or shorter than the securing face to which the clamping device is secured. As a result of the integral construction of the securing portion and receiving portion, a reliable redirection of tensile and pressure forces into the carrier structure can also be carried out in this instance.

In another embodiment, at least one spacer element is arranged on the additional side wall portion in order to ensure a minimum spacing between the additional side wall portion and a carrier structure, in particular the securing face thereof. The spacer element may in this instance be constructed by the additional side wall portion. The spacer element may in this instance be constructed as an elongate element, wherein a longitudinal axis of the spacer element may be orientated parallel with the longitudinal axis of the clamping device. A length of the spacer element may in this instance be equal to the length of the side wall portion. However, it is also possible for the length of the spacer element to be shorter than the length of the side wall portion.

The spacer element may be constructed as a hollow or solid profile-like element. For example, the spacer element in a cross sectional plane which is orientated perpendicularly to the longitudinal axis may have a triangular, rectangular or semi-circular profile. A tip of the triangular profile may be orientated away from the additional side wall portion and in particular face downward.

The spacer element may in particular be arranged on or in the region of a free end of the additional side wall portion.

A height of the spacer element may correspond to a desired minimum spacing between the carrier structure and the lower side of the solar module which is intended to be clamped or be greater than this minimum spacing. For example, the height of the spacer element may correspond to the above-explained spacing between the contact face and the inner end portion of the additional side wall portion. The height of the spacer element may in the clamped state of the solar module determine the spacing of the lower side of the solar module from the carrier structure, in particular from the securing face thereof.

Furthermore, the spacer element may be arranged at a side facing away from the receiving region, in particular at a lower side, of the additional side wall portion. The spacer element may in this instance be constructed as a raised region at this side of the additional side wall portion. Since the spacer element is arranged at the lower side, there is advantageously produced no shading of the upper side of the solar module in the clamped and assembled state. This in turn advantageously enables more efficient operation. Furthermore, this advantageously results, in particular in the clamped state of the solar module, in the above-explained minimum spacing being ensured by the clamping device.

In another embodiment, in a non-deformed state of the additional side wall portion, a contact portion of the spacer element is arranged below the contact portion of the securing portion. The assembly of the solar module on the carrier structure is thereby advantageously simplified. It is thus possible, for example, for the clamping device in the non-deformed state of the additional side wall portion to be placed on a securing face of the carrier structure, wherein the contact portion of the spacer element and not the contact portion of the securing portion is positioned on the securing face. The clamping device can then be movably connected to the carrier structure in this non-deformed state. This may be carried out, for example, by means of partial screwing of the securing portion to the carrier structure. The solar module which is intended to be mounted can then be arranged in the receiving region. Since the receiving portion is in the non-deformed state, this is possible in a simple manner. Furthermore, the securing portion may then be moved into mechanical contact with the securing face of the carrier structure, for example, by means of secure screwing of the securing portion to the carrier structure. If the contact portion of the securing portion is brought into mechanical contact with the securing face, at the same time the additional side wall portion is bent in the direction toward the lower side of the solar module, in particular in an upward direction. As a result of this bending, the solar module which is arranged in the receiving region is clamped.

In another embodiment, a sealing element receiving portion is arranged on the additional side wall portion. The sealing element is explained in greater detail below. Alternatively or cumulatively a sealing element receiving portion may be arranged on the base wall portion or the first side wall portion. For example, the first side wall portion may have or form a web-like element which serves to secure a sealing element.

The sealing element receiving portion of the additional side wall portion may in particular be formed by the spacer element or a portion thereof. For example, the sealing element receiving portion may be formed by an inner volume of a hollow-profile-like spacer element. In this instance, a corresponding securing portion of the sealing element may be arranged in the sealing element receiving portion, whereby the sealing element is mechanically secured to the additional side wall portion. It thereby becomes advantageously simple to produce the clamping device which additionally comprises a sealing element.

In another embodiment, the clamping device comprises at least one sealing element, wherein at least a portion of the sealing element is arranged on the first and/or a/an (additional) portion of the sealing element is arranged on the additional side wall portion. In particular, at least a portion of the sealing element may be arranged at a side or surface of the first and/or additional side wall portion facing the receiving region.

The sealing element may in particular form a so-called EPDM seal. The sealing element may, in a cross sectional plane which is orientated perpendicularly to the above-explained longitudinal axis, be constructed in the form of a U-shaped profile. A length of the sealing element may in this instance correspond to a length of the receiving portion.

The sealing element may in this instance be mechanically secured to the first and/or additional side wall portion and/or where applicable to the base wall portion. In this instance, the sealing element may, for example, be clamped or adhesively-bonded.

The surfaces of the first side wall portion, the additional side wall portion and/or the base wall portion facing the receiving region may be constructed in a planar or non-planar manner.

A surface of the corresponding portion of the sealing element may be constructed in a planar or non-planar manner, which surface faces away from the first or additional side wall portion. A surface of the corresponding portion of the sealing element may also be constructed in a planar or non-planar manner, which surface faces away from the base portion. A non-planar surface may in particular have a toothed profile. Non-planar may mean that the corresponding surface has recesses and/or protrusions.

The surface of the corresponding portion of the sealing element facing the first and/or the additional side wall portion and/or the base wall portion may also be constructed in a planar or non-planar manner.

Furthermore, a surface of the corresponding portion of the sealing element facing the first or additional side wall portion may have a securing portion or element for securing to the corresponding side wall portion. For example, the surface which faces the additional side wall portion may have an extension which has a mushroom-shaped, triangular or tooth-like cross section and which can be arranged in or on the above-explained sealing element receiving portion.

The sealing element may in this instance have a predetermined thickness. The thickness of the sealing element may in this instance be selected in accordance with a thickness of the solar module and a height of the receiving portion in such a manner that reliable clamping of the solar module in the receiving portion of the clamping device can be ensured.

In another embodiment, at least a portion of the sealing element is arranged on a base wall portion of the first receiving portion, wherein the surface of the portion facing the base wall portion and/or the surface of the portion facing away from the base wall portion is constructed in a non-planar manner, in particular in the form of a toothed profile.

The non-planar construction of the surface facing the base wall portion and/or of the surface of the portion of the sealing element facing away from the base wall portion may in this instance represent a separate and independent invention. Consequently, a clamping device for a solar module is described, wherein the clamping device has or forms at least a first receiving portion for receiving an edge portion of the solar module, wherein the first receiving portion has at least a first side wall portion, an additional side wall portion and a base wall portion in order to form a receiving region. Furthermore, the clamping device has a sealing element which is arranged in a receiving region of the receiving portion, wherein the surface of a portion of the sealing element facing the base wall portion and/or the surface of the portion of the sealing element facing away from the base wall portion is constructed in a non-planar manner.

A non-planar construction may in this instance also refer to a curved construction.

A resilient buffer is thereby advantageously provided between an edge side of the solar module and the base wall portion and enables play-free assembly with at the same time any constraint being avoided. In particular, it is consequently no longer necessary to maintain a minimum spacing of, for example, 1 mm between the base wall portion and the edge side of the solar module during assembly.

In another embodiment, at least a portion of the sealing element is arranged on a side wall portion of the first receiving portion, wherein the surface of the portion of the sealing element facing the side wall portion and/or the surface of the portion of the sealing element facing away from the side wall portion is constructed in a non-planar manner, in particular in the form of a toothed profile. This advantageously affords the possibility of a planar support of the resiliently deformable sealing element on the solar module, which prevents contamination within the securing face with respect to the module surface.

In another embodiment, a surface of the first and/or the additional side wall portion facing the receiving region is constructed in a non-planar manner, in particular in the form of a toothed profile.

In another embodiment, a transition from the receiving region or from the sealing element to the first receiving portion has a predetermined electrical conductivity. The transition may in particular be constructed in an electrically insulating or electrically conductive manner.

The transition from the receiving region or from the sealing element to the first receiving portion may in particular designate the transition from an outer side of the solar module to the side wall portions or the base wall portion or a transition from the sealing element to the side wall portions or the base wall portion.

In particular, a surface of the first side wall portion and/or the additional side wall portion and/or where applicable a base wall portion, which surface faces the receiving region and consequently a clamped solar module, may be anodized and/or coated, in particular with an electrically insulating material. As a result of the anodization and/or coating of the clamping device, there is advantageously produced a low electrical conductivity as a desired electrical insulation between the sealing element and the clamping device so that the solar module is supported in a highly electrically-resistive manner with respect to earth potential.

As a result of a low electrical conductivity, in particular an insulation, operational reliability can advantageously be increased since, in the event of damage, a current flow between the solar module and carrier structure is prevented and consequently any risk of fire is reduced. As a result of an electrically conductive construction of the transition, an undesirably high potential difference between the solar module and clamping device can advantageously be prevented.

A method for assembling a solar module is further proposed. In a first step, a clamping device according to one of the embodiments explained in this invention may be arranged at or on a carrier structure. In particular the clamping device may be arranged on a securing face of the carrier structure.

In a second step, an edge portion of the solar module may be arranged in a receiving region of the clamping device. The receiving region may in this instance be constructed by the receiving portion explained above. In a third step, the clamping device is secured to the carrier structure. Of course, it is also possible for the first and the second step of the method to be transposed.

In particular the clamping device may be arranged in a non-deformed state on or at the carrier structure. Furthermore, the edge portion of the solar module may also be arranged in a non-deformed state of the clamping device in the receiving region. As explained above, these steps can also be transposed. Furthermore, the clamping device can be secured to the carrier structure, wherein the clamping device is deformed during the securing. In particular the clamping device can be deformed in such a manner that the solar module is clamped in the receiving region.

In another embodiment, when or whilst the clamping device is secured to the carrier structure, the edge portion is clamped between the first and the additional side wall portion. In particular, when the clamping device is secured to the carrier structure, the additional side wall portion can be bent in the direction toward the lower side of the solar module, in particular in an upward direction.

A simple arrangement of the edge portion in the receiving region and a subsequent clamping is thereby advantageously achieved. These partial steps simplify the overall assembly of the solar module on the carrier structure.

In another embodiment, the clamping device is secured to the carrier structure by a securing portion of the clamping device being secured to the carrier structure in such a manner that a contact portion, in particular a contact face, of the securing portion abuts the carrier structure, in particular is positioned on the securing face.

In another embodiment, only a portion of a contact portion or the complete contact portion of the securing portion and/or only a portion of a contact portion of a spacer element or the complete contact portion of the spacer element is in abutment with the carrier structure, in particular is positioned on the securing face of the carrier structure.

This advantageously results in a solar module being able to be secured to carrier structures with different dimensions, wherein, however, a desired redirection of tensile and pressure forces of the solar module into the carrier structure is ensured.

The proposed method can consequently be carried out with a clamping device according to one of the embodiments described in this invention.

There is further described a method for producing a clamping device. In this instance, a base member may be provided, for example, in the form of a block. The base member may in this instance comprise a desired material, for example, metal, preferably aluminum. Furthermore, the base member may be deformed in such a manner that a receiving portion is formed for receiving an edge portion of the solar module, wherein the receiving portion has at least a first side wall portion and an additional side wall portion in order to form a receiving region. Of course, the receiving portion may also comprise a base wall portion. The shaping may in particular be carried out by means of an extrusion method.

Of course, there is also described a method for producing a clamping device which comprises all the necessary steps for providing a clamping device in accordance with one of the embodiments explained in this invention.

There is further described an arrangement of a clamping device according to one of the embodiments described in this invention and a carrier structure, wherein the clamping device is secured to the carrier structure, in particular rigidly secured. In this instance, a contact portion, in particular a contact face, of a securing portion of the clamping device can be completely or incompletely in abutment with the carrier structure, in particular a securing face of the carrier structure. It is in particular possible for a portion or several portions of the clamping device to project over the carrier structure in the secured state. The arrangement may further comprise at least one solar module, which is arranged in a receiving region of the clamping device. In this instance, an edge portion of the solar module may be clamped in the receiving region in the rigidly secured state.

BRIEF DESCRIPTION OF THE SEVERAL VIEWS OF THE DRAWING

The invention is explained in greater detail with reference to a plurality of embodiments. In the Figures:

FIG. 1 is a perspective view of a clamping device according to the invention,

FIG. 2 is a cross section through the clamping device illustrated in FIG. 1,

FIG. 3 is a plan view of the clamping device illustrated in FIG. 1,

The same reference numerals refer below to elements with identical or similar technical features.

DESCRIPTION OF THE INVENTION

Figure 4:
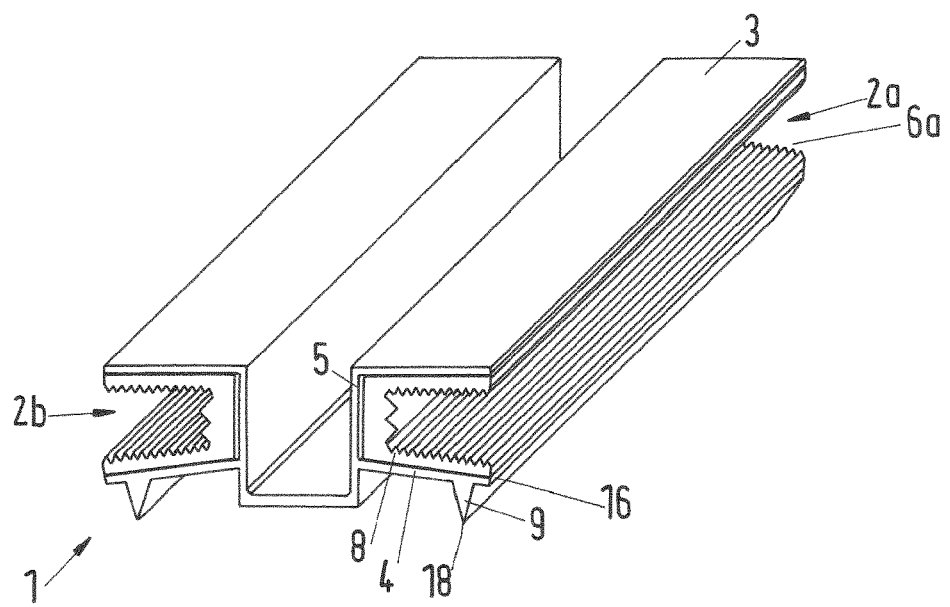
FIG. 4 is a perspective view of a clamping device in another embodiment.

FIG. 1 is a perspective view of a clamping device 1 according to the invention. The clamping device 1 comprises a first receiving portion 2a and an additional receiving portion 2b. The receiving portions 2a, 2b are arranged at opposing sides of the clamping device 1 along a transverse axis y.

In addition to the transverse axis y, a longitudinal axis x and a vertical axis z and the corresponding directions are illustrated. The longitudinal axis x, transverse axis y and vertical axis z form a reference coordinate system.

For the sake of clarity, only the first receiving portion 2a is described below. However, the statements relating to the first receiving portion 2a also apply accordingly to the additional receiving portion 2b.

The first receiving portion 2a comprises a first side wall portion 3 and an additional side wall portion 4. Furthermore, the first receiving portion 2a comprises a base wall portion 5. It is illustrated that the first receiving portion 2a in a cross sectional plane which is orientated perpendicularly to the longitudinal axis x has a U-shaped cross section, wherein the first side wall portion 3 encloses a right angle with the base wall portion 5 and wherein the additional side wall portion 4 encloses an obtuse angle, for example, an angle of 97.5°, with the base wall portion 5. The side wall portions 3, 4 are constructed in a plate-like manner. The base wall portion is also constructed in a plate-like manner. The first receiving portion 2a forms a first receiving region 6a in which an edge region of a solar module 7 (see, for example, FIG. 11) can be arranged.

There is further illustrated a sealing element 8 which is arranged in the first receiving region 6a and which is in abutment with the surfaces of the side wall portions 3, 4 or the base wall portion 5 which face the receiving region 6a.

The clamping device 1 illustrated in FIG. 1 is illustrated in a non-deformed, in particular non-bent, state.

There is further illustrated a spacer element 9 which is arranged at a free end of the additional side wall portion 4. The spacer element 9 is in the form of a hollow profile and in a cross sectional plane which is orientated perpendicularly to the longitudinal axis x is constructed in a triangular manner. The spacer element 9 is in this instance arranged on a surface of the additional side wall portion 4 facing away from the receiving region 6a. In particular, the spacer element 9 is formed by the additional side wall portion 4. The spacer element 9 or the additional side wall portion 4 has a through-opening which connects an inner space of the hollow-profile-like spacer element 9 to the receiving region 6a. The through-opening is in this instance constructed as an elongate hole whose width is smaller than a width of the base side of the spacer element 9.

There is further illustrated an extension 10 of the sealing element 8, which extension 10 is mushroom-shaped in cross section and is arranged in the inner spacer of the spacer element 9. The portions of the base side of the spacer element 9 delimiting the elongate hole may engage in the undercuts of the mushroom-like extension 10, whereby a mechanical connection is ensured between the sealing element 8 and the clamping device 1. Of course, cumulative or alternative securing types, for example, adhesive or catch connections, are also conceivable.

Furthermore, the clamping device 1 comprises a securing portion 11. The securing portion 11 comprises a base plate 12 whose lower side has a contact face 13. If the clamping device 1 is arranged on a securing face 15 of a carrier structure 14 (see, for example, FIG. 10), in the rigidly secured state the contact face 13 is in mechanical contact with the securing face 15 (see FIG. 10) of the carrier structure 14. The base plate 12 is in this instance arranged parallel with the first side wall portion 3. In this instance, the contact face 13 is a planar face which is arranged parallel with a plane which is defined by the longitudinal axis x and the transverse axis y.

The securing portion may further comprise a connection portion 14 which connects the base plate 12 to the first receiving portion 2a. The connection portion 14 may in this instance be arranged perpendicularly to the base plate 12.

The additional side wall portion 4 can be bent around a bending axis 21 which is orientated parallel with the longitudinal axis x of the clamping device 1. The bending axis 21 may in this instance extend along an inner end portion of the additional side wall portion 4, wherein the inner end portion refers to the end portion of the additional side wall portion 4 which is arranged opposite a free end portion 16 and which is securely clamped on the base wall portion 5.

In FIG. 2, the clamping device 1 illustrated in FIG. 1 is illustrated in cross section. Only the first receiving portion 2a is again described below. It is illustrated that, in the non-deformed state of the additional side wall portion 4, a spacing between the first and the additional side wall portion 3, 4 increases in the direction toward the free ends 16 of the side wall portions 3, 4. A maximum spacing Dmax between the first and the additional side wall portion 3, 4 along the vertical axis z may in this instance be the spacing between the free ends 16 of the side wall portions 3, 4. This maximum spacing Dmax may in particular be greater by a predetermined dimension than a thickness D7 of a solar module 7 (see, for example, FIG. 11). Of course, the maximum spacing which is not illustrated between free ends of the sealing element 8 which is arranged in the first receiving region 2a may also be greater than the thickness D7 of the solar module 7.

There is further illustrated a spacing D13 along the vertical axis z of the contact face 13 of the base plate 12 from the inner end portion of the additional side wall portion 4. A height H9 of the spacer element 9 below the additional side wall portion 4 may in this instance be equal to this spacing D13. The spacing D13 and the height H9 determine a minimum spacing of a lower side of the solar module 7 from a securing face 15 of a carrier structure 14 (see also FIG. 12). If a sealing element 8 is arranged in the first receiving region 2a, a spacing in the vertical direction between the lower side and the securing face 15 is generally greater than the predetermined spacing D13 or the height H9 of the spacer element 9.

There is further illustrated a through-opening 17 which is arranged in the base plate 12. Through the through-opening 17, a screw 20 (see, for example, FIG. 11) can be introduced into a carrier structure 14, for example, into a corresponding threaded hole, in order to screw the clamping device 1 to the carrier structure 14.

FIG. 2 illustrates that the surfaces of the side wall portions 3, 4 and the base wall portion 5 facing the first receiving region 2a are constructed as planar faces. Furthermore, a surface of the portions of the sealing element 8 which are in abutment with the side wall portions 3, 4 and which face the receiving region 6a is constructed in a non-planar manner, in particular toothed. A surface of the portion of the sealing element 8 facing the receiving region 6a is constructed in a planar manner, which portion is in abutment with the base wall portion 5. However, the surface of the portion of the sealing element 8, which portion is arranged on the base wall portion 5 and which faces the base wall portion 5, is constructed in a non-planar, in particular also toothed, manner. The sealing element 8 may in particular be constructed as a compression-resilient EPDM sealing element. The toothed-profile-like construction of the non-planar surfaces advantageously enables an assembly of a solar module 7 without constraint and without play.

It is further illustrated in FIG. 2 that a contact portion 18, in particular a tip of the spacer element 9, in the non-deformed state of the first receiving portion 2a is arranged in the vertical direction below the contact face 13.

FIG. 3 is a plan view of the clamping device 1 illustrated in FIG. 1. There is illustrated the through-opening 17 which is arranged in the base plate 12 and which represents a securing means of the clamping device 1 according to the invention. A length L of the clamping device 1 is further illustrated, wherein the length L of the clamping device 1 may correspond to a length of the receiving regions 2a, 2b (see FIG. 1) and a length of the spacer element 9. The length L in this instance is measured along the longitudinal axis x.

FIG. 4 is a perspective view of a clamping device 1 according to the invention in another embodiment. Again, only the first receiving portion 2a is described. In contrast to the embodiment illustrated in FIG. 1, all the surfaces of the sealing element 8 facing the side wall portions 3, 4 and the base wall portion 5 are constructed in a planar manner. This means that these surfaces are completely in abutment with the corresponding surfaces of the side wall portions 3, 4 and the base wall portion 5. Furthermore, in contrast to the embodiment illustrated in FIG. 1, the surface of the portion of the sealing element 8 facing the first receiving region 6a is constructed in a non-planar, in particular toothed-profile-like, manner, which portion is in abutment with the base wall portion 5.

Furthermore, in contrast to the embodiment illustrated in FIG. 1, there is no mushroom-like extension 10 of the sealing element 8 to clamp the sealing element 8 to the first receiving portion 6a. Instead, the sealing element 8 is adhesively bonded to the side wall portions 3, 4 and the base wall portion 5.

Furthermore, in contrast to the embodiment illustrated in FIG. 1, the spacer element 9 is constructed in the form of a solid profile. It is further illustrated that, although the spacer element 9 is arranged in the region of the free end 16 of the other side wall portion 4, it is not directly at but instead spaced apart from the free end 16.

Figure 5:
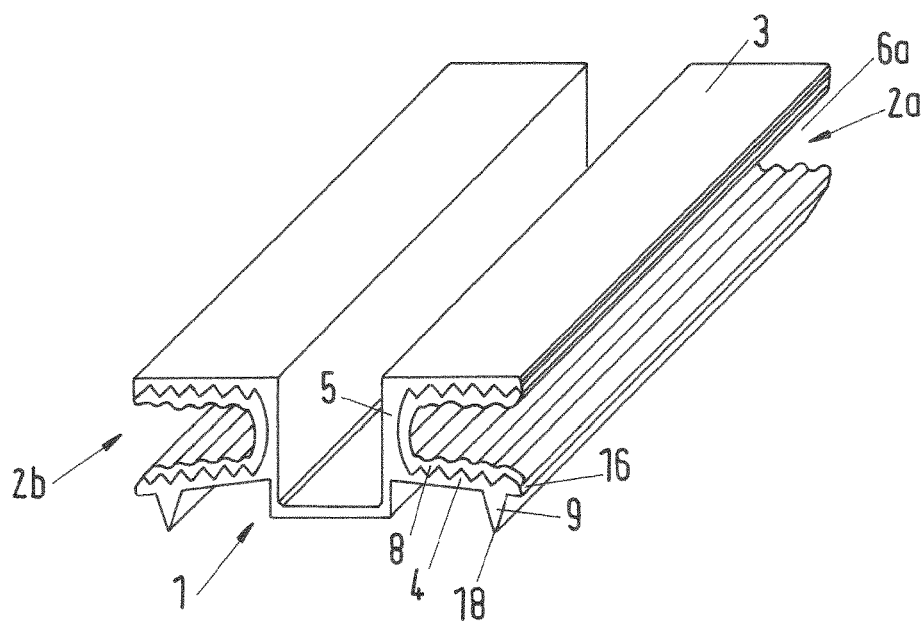
FIG. 5 is a perspective view of a clamping device in another embodiment.

FIG. 5 is a perspective view of a clamping device 1 in another embodiment. In contrast to the embodiment illustrated in FIG. 4, the surfaces of the side wall portions 3, 4 facing the first receiving region 6a are constructed in a non-planar, in particular toothed-profile-like, manner. A surface of the base wall portion 5 facing the first receiving region 6a is constructed in a concave-curved manner with respect to the first receiving region 6a. Surfaces of the portions of the sealing element 8 are constructed accordingly. In particular the surfaces of the sealing element 8 facing the first receiving region 6a in the region of portions which are in abutment with the side wall portions 3, 4 are constructed in a non-planar, in particular toothed-profile-like, manner. A surface of the sealing element 8 in the region of the portion in abutment with the base wall portion 5 is also constructed in a concave-curved manner with respect to the first receiving region 6a.

The portions of the sealing element 8 facing the side wall portions 3, 4 or the base wall portion 5 are constructed in such a manner that a positive-locking arrangement of the sealing element 8 with the side wall portions 3, 4 and the base wall portion 5 is enabled. In particular, the portions of the sealing element 8 which face the side wall portions 3, 4 are also constructed in a non-planar, in particular toothed-profile-like, manner. The surface of the portion of the sealing element 8 facing the base wall portion 5 is also constructed in a curved manner.

As in the embodiment of the clamping device illustrated in FIG. 4, the spacer element 9 is constructed in the manner of a solid profile and is arranged in the region of the free end 16, but not directly at the free end, of the additional side wall portion 4.

Figure 6:
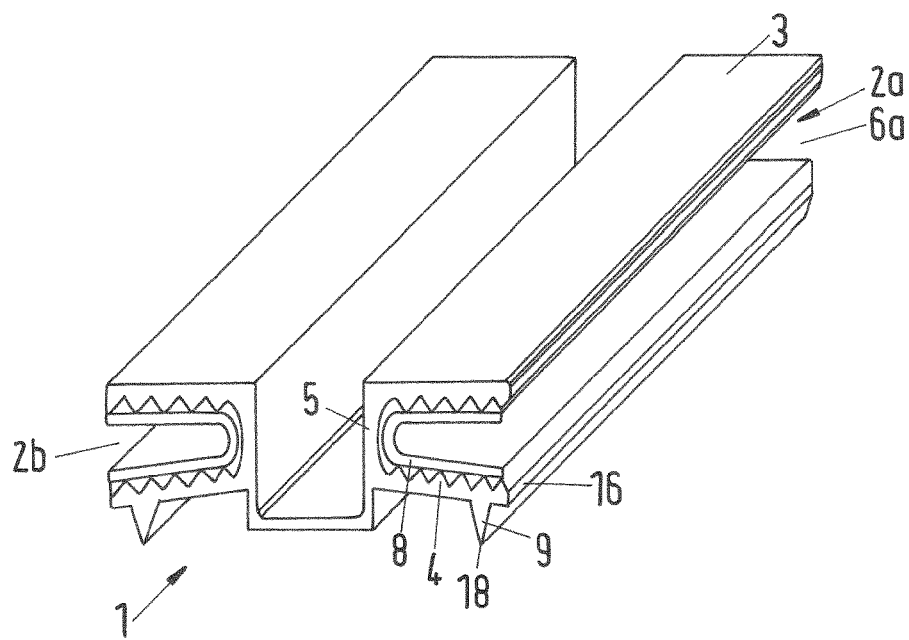
FIG. 6 is a perspective view of a clamping device in another embodiment.

FIG. 6 is a perspective view of a clamping device 1 according to the invention in another embodiment. In contrast to the embodiment illustrated in FIG. 5, the surfaces of the portions of the sealing element 8 facing the first receiving region 6a are constructed in a planar manner. The surfaces of the corresponding portions of the sealing element 8 facing the side wall portions 3, 4 and the base wall portion 5 are also constructed in a planar, that is to say, non-toothed, manner.

Figure 7:
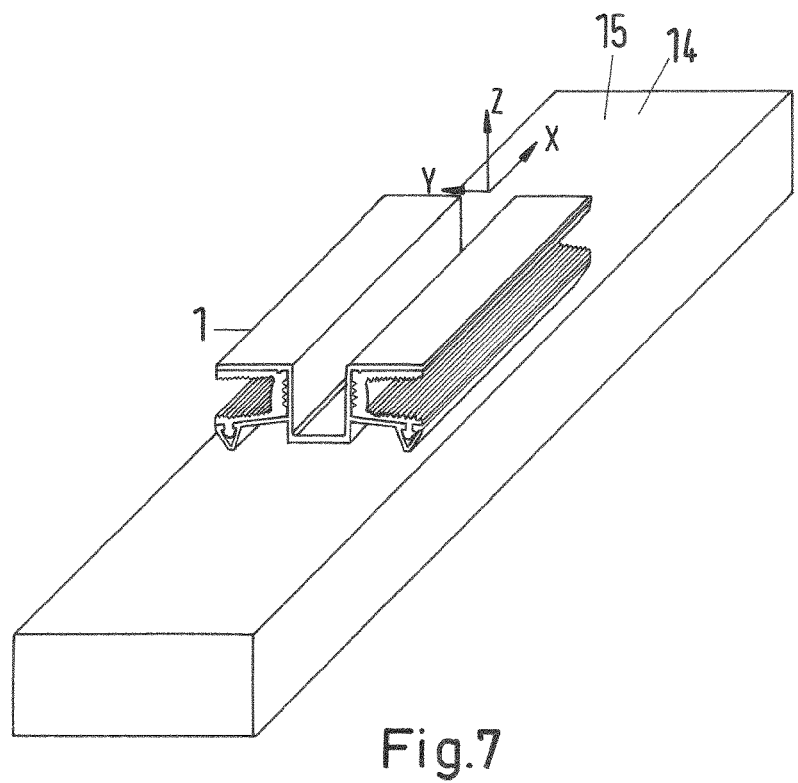
FIG. 7 is a perspective view of a carrier structure with a clamping device according to the invention.

FIG. 7 is a perspective view of the clamping device 1 and a carrier structure 14 illustrated in FIG. 1. The carrier structure 14 may, for example, be constructed as a supporting bar. The carrier structure 14 may have a planar securing face 15.

FIG. 7 illustrates that a length of the carrier structure 14 is greater than a length L (see FIG. 3) of the clamping device 1 and a width of the carrier structure 14 is greater than a width of the clamping device 1. The clamping device 1 is in this instance arranged on the securing face 15 in such a manner that the longitudinal axis x of the clamping device 1 is orientated parallel with the longitudinal center axis (not illustrated) of the carrier structure 14. In this instance, the contact tip 18 of the spacer element 9 is positioned over the entire length thereof on the securing face 15. The clamping device 1 is in this instance illustrated in a non-deformed state 1, wherein a solar module 7 is not yet clamped by the clamping device 1.

Figure 8:
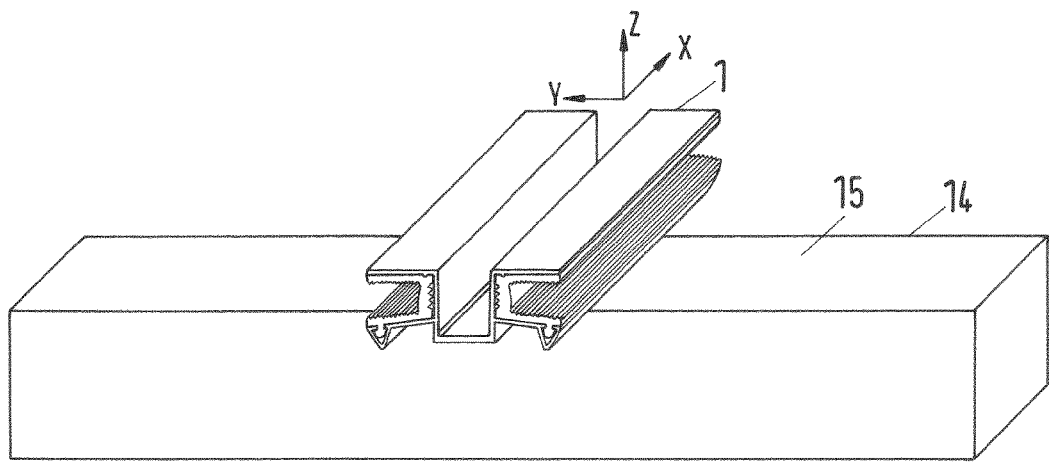
FIG. 8 is a perspective view of another carrier structure with a clamping device according to the invention.

FIG. 8 is a perspective view of a clamping device 1 which is in accordance with the embodiment illustrated in FIG. 1 and which is arranged in the non-deformed state on a securing face 15 of an additional carrier structure 14. In this instance, the clamping device 1 is arranged in such a manner on the bar-like carrier structure 14 that the longitudinal center axis x of the clamping device 1 is orientated transversely relative to the longitudinal center axis of the carrier structure 14. In this instance, therefore, the transverse axis y of the clamping device 1 is arranged parallel with the longitudinal center axis of the carrier structure 14. Furthermore, a width of the carrier structure 14 is smaller than the length L (see FIG. 3) of the clamping device 1. Consequently, the contact tip 18 of the clamping device 1 is not positioned on the securing face 15 over the entire length thereof. As a result of the integral construction of the clamping device 1, however, the clamping device 1 has a high bending resistance about a bending axis which is orientated parallel with the transverse axis y. Consequently, in the embodiment illustrated in FIG. 8 in which portions of the clamping device 1 protrude over the carrier structure 14, a desired force redirection of tensile and pressure forces which act on a solar module 7 (see, for example, FIG. 11) into the carrier structure 14 can also be ensured.

Figure 9:
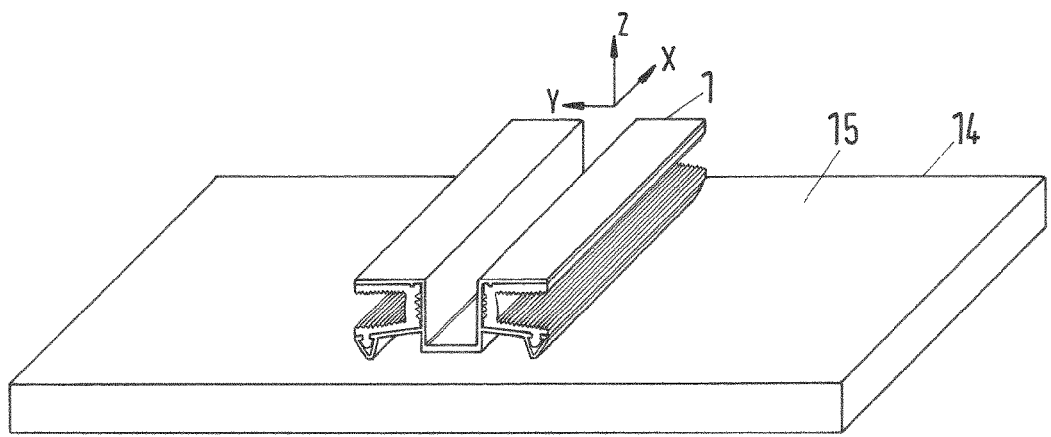
FIG. 9 is a perspective view of another carrier structure with a clamping device.

FIG. 9 is a perspective view of a carrier structure 14 on which a clamping device 1 according to the embodiment illustrated in FIG. 1 is arranged. As in the embodiment illustrated in FIG. 8, the longitudinal axis x of the clamping device 1 is orientated transversely relative to a longitudinal center axis of the carrier structure 14. Consequently, the transverse axis y is orientated parallel with the longitudinal center axis. However, a width of the carrier structure 14 is greater than the length L (see FIG. 3) of the clamping device 1 so that the contact tip 18 of the spacer element 9 of the clamping device 1 is positioned on the securing face 15 over the entire length thereof.

The embodiments illustrated in FIG. 7, FIG. 8 and FIG. 9 show that the clamping device 1 is possible for securing solar modules 7 to different types of carrier structures 14. Depending on the orientation of the solar modules 7 and the carrier structure 14, the clamping devices 1 can be used to receive portions of an end face or a longitudinal side of a solar module 7 (see, for example, FIG. 11). The clamping device 1 consequently enables securing to narrow substructures, wide substructures, wherein the substructures, in particular bars of the substructure, may be orientated either parallel with end faces of the solar modules 7 or longitudinal sides of the solar modules 7.

Figure 10:
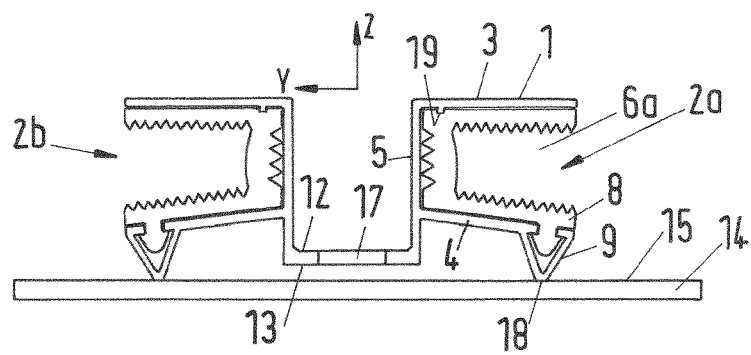
FIG. 10 shows a clamping device in a positioned and unsecured state.
Figure 11:
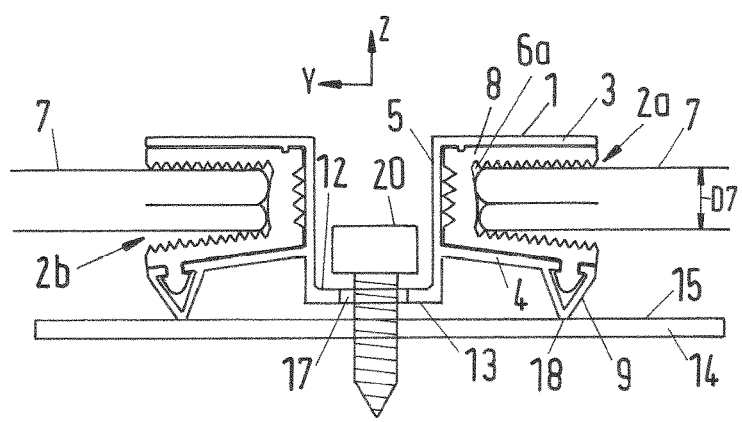
FIG. 11 is a side view of a clamping device in a positioned and movably secured state.

FIG. 10 is a cross section through a clamping device 1 which is illustrated on a securing face 15 of a carrier structure 14 in a non-deformed state and without any solar module 7 being received (see FIG. 11). The state illustrated in FIG. 10 may represent an initial state during an assembly of a solar module 7 by means of a clamping device 1. The clamping device 1 is in this instance constructed in accordance with the embodiment illustrated in FIG. 1. In FIG. 10 there is also in particular illustrated a securing web 19 which is arranged on a surface of the first side wall portion 3 facing the first receiving region 6a. This web 19 also serves to secure the sealing element 8. Since, in the non-deformed state, the contact tips 18 of the spacer elements 9 are arranged in the vertical direction below the contact face 13 of the base plate 12, the contact face 13 is in the initial state not in abutment with the securing face 15. Instead in the initial state only the contact tips 18 of the spacer elements 9 are in mechanical contact with the securing face 15.

FIG. 11 is a cross section through a clamping device 1 which is arranged on a securing face 15 of a carrier structure 14. In this instance, the clamping device 1 is movably connected to the carrier structure 14 (loose securing state). Furthermore, an edge region of a solar module 7 is arranged in the first receiving region 6a and an additional solar module 7 in the additional receiving region 2b of the clamping device 1. However, the clamping device 1 is located in the non-deformed state. In particular, the additional side wall portion 4 is in a non-bent state. FIG. 11 illustrates that a screw 20 extends through the through-opening 17 of the base plate 12 into the carrier structure 14. In this instance, the clamping device 1 is movably connected to the carrier structure 14 by means of the screw 18. This may mean that, at least in a vertical direction, there is no positive-locking and/or non-positive-locking connection between the carrier structure 14 and clamping device 1. The movable connection may in particular refer to a connection in which the clamping device 1 can still be moved to a limited degree relative to the carrier structure 14.

FIG. 11 shows that a simple introduction of solar modules 7 into the receiving regions 6a of the receiving portions 2a, 2b is achieved since a minimum spacing between the portions of the sealing element 8 which are in abutment with the side wall portions 3, 4 is greater than or equal to a thickness D7 of the solar module.

The transition from the initial state illustrated in FIG. 10 to the movable securing state illustrated in FIG. 11 can be achieved either by the clamping device 1 first being movably connected to the carrier structure 14 by means of the screw 20 and then solar modules 7 being introduced into the receiving regions 6a of the receiving portions 2a, 2b or by solar modules 7 first being introduced into the receiving regions 6a of the receiving portions 2a, 2b and the clamping device 1 then being movably connected to the carrier structure 14 by means of the screw 18.

In FIG. 11, the clamping device is further located in the non-deformed state so that the contact face 13 of the base plate 12 continues to be spaced apart from the securing face 15 in the vertical direction. Consequently, as illustrated in FIG. 10, only the contact tips 18 of the spacer elements 9 continue to touch the securing face 15.

Figure 12:
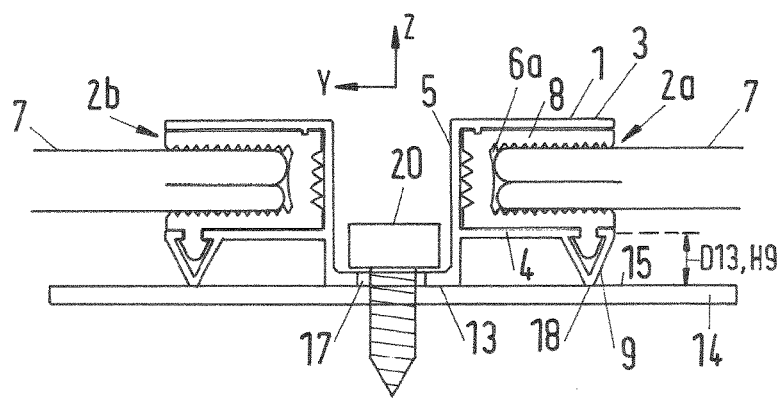
FIG. 12 shows a clamping device in a positioned and secured state.

FIG. 12 is a cross section through a clamping device 1 in a rigidly secured state, wherein solar modules 7 are arranged in the receiving regions 6a of the receiving portions 2a, 2b. In the rigidly secured state, the clamping device 1 is connected to the carrier structure 14 in a non-positive-locking manner by means of the screw 20. Furthermore, the contact face 13 is in abutment with the securing face 15 of the carrier structure 14. As a result of the screw 20 being screwed in, the base plate 12, in particular the contact face 13 thereof, is moved in the direction toward the carrier structure 14, in particular in the direction toward the securing face 15. As a result of the integral construction of the receiving portions 2a and the base plate 12, during this movement the additional side wall portion 4 is bent over the spacer element 9 in the direction toward the lower side of a received solar module 7. The edge region of the solar module 7 is thereby clamped in the receiving region 6a of the corresponding receiving portion 2a, 2b. In the clamped state, the sealing element 8 is in abutment with the outer sides of the solar module 7.

It is not illustrated that the surfaces of the side wall portions 3, 4 or the base wall portion 5 facing the receiving region 6a may be anodized in order to ensure electrical insulation between the clamping device 1 and the solar module 7.

A risk of fire can thereby advantageously be reduced since no current flow can be produced. However, a low-resistance connection may be desirable if no or only the lowest possible potential difference is required between the module and the carrier structure 14. In FIG. 12, it can further be seen that a desired minimum spacing is produced between the securing face 15 and a lower side of the solar module 7 by the construction of the clamping device 1, in particular by the provision of the spacer element 9.

On the whole, there is consequently described a clamping device 1 which enables a reduction of the production costs, ensures increased safety with correct solar module assembly and simplifies a module assembly.

LIST OF REFERENCE NUMERALS

1 Clamping device
2a First receiving portion
2b Additional receiving portion
3 First side wall portion
4 Additional side wall portion
5 Base wall portion
6a First receiving region
7 Solar module
8 Sealing element
9 Spacer element
10 Mushroom-like extension
11 Securing portion
12 Base plate
13 Contact face
14 Carrier structure
15 Securing face
16 Free end
17 Through-opening
18 Contact tip
19 Web
20 Screw
21 Bending axis
22 Connection portion
H9 Height of the spacer element
Dmax Maximum spacing
D13 Predetermined spacing
D7 Thickness of the solar module

The invention claimed is:

1. A clamping device for a solar module, the clamping device comprising:
a receiving portion for receiving an edge portion of the solar module, said receiving portion having at least a first side wall portion and an additional side wall portion together forming a receiving region;
said additional side wall portion being bendable about a bending axis, and the bending axis being orientated parallel with a longitudinal axis of the clamping device;
said receiving portion being constructed integrally in one piece;
at least one spacer element disposed on said additional side wall portion and configured for ensuring a minimum spacing between said additional side wall portion and a carrier structure, said spacer element being constructed by said additional side wall portion; and
said receiving portion having a modulus of elasticity greater than a modulus of elasticity of rubber.

2. The clamping device according to claim 1, wherein, in a non-deformed state of said additional side wall portion, the additional side wall portion is inclined at an angle greater than 0° and less than 90° with respect to said first side wall portion.

3. The clamping device according to claim 1, wherein, in a non-deformed state of said additional side wall portion, a maximum spacing between said first side wall portion and said additional side wall portion is greater than a thickness of the solar module to be clamped.

4. The clamping device according to claim 1, wherein said receiving portion is formed of metal.

5. The clamping device according to claim 1, further comprising a securing portion for securing the clamping device to a carrier structure, wherein said securing portion has a contact portion formed for support on the carrier structure.

6. The clamping device according to claim 5, wherein said at least one spacer element is formed with a contact portion and, in a non-deformed state of said additional side wall portion, said contact portion of said spacer element is arranged below said contact portion of said securing portion.

7. The clamping device according to claim 1, wherein said additional side wall portion has a sealing element receiving portion for receiving a sealing element.

8. The clamping device according to claim 1, further comprising at least one sealing element, wherein at least a part of said sealing element is arranged on said first side wall portion and/or on said additional side wall portion.

9. The clamping device according to claim 8, wherein said receiving portion has a base wall portion, and at least a part of said sealing element is arranged on said base wall portion, and wherein a surface of said sealing element facing said base wall portion and/or a part of said sealing element facing away from said base wall portion is a non-planar surface.

10. The clamping device according to claim 8, wherein at least a part of said sealing element is arranged on a side wall portion of said receiving portion, and wherein a surface of said sealing element facing the side wall portion and/or a surface of said sealing element facing away from said side wall portion is a non-planar surface.

11. The clamping device according to claim 1, wherein a surface of said first side wall portion and/or of said additional side wall portion facing said receiving region is a non-planar surface.

12. The clamping device according to claim 1, wherein a transition region from said receiving region or from a sealing element to said receiving portion has a predetermined electrical conductivity.

13. A method for assembling a solar module, the method comprising:
placing a clamping device according to claim 1 at or on a carrier structure;
arranging an edge portion of the solar module in a receiving region of the clamping device; and
securing the clamping device to the carrier structure.

14. The method according to claim 13, which comprises, concurrently with the securing step, clamping the edge portion of the solar module between the first side wall portion and the additional side wall portion as the clamping device is being secured to the carrier structure.

15. The method according to claim 13, wherein the step of securing the clamping device to the carrier structure comprises securing a securing portion of the clamping device to the carrier structure with a contact portion of the securing portion abutting the carrier structure.

16. The method according to claim 15, wherein only a portion of a contact portion of the securing portion and/or only a portion of a contact portion of a spacer element is in abutment with the carrier structure.

17. The method according to claim 15, wherein the complete contact portion of the securing portion and/or a complete contact portion of a spacer element is in abutment with the carrier structure.

* * * * *